(12) United States Patent
Hadwiger et al.

(10) Patent No.: US 8,854,422 B2
(45) Date of Patent: Oct. 7, 2014

(54) APPARATUS FOR RENDERING SURROUNDINGS AND VEHICLE HAVING SUCH AN APPARATUS FOR RENDERING SURROUNDINGS AND METHOD FOR DEPICTING PANORAMIC IMAGE

(75) Inventors: Peter Hadwiger, Garching (DE); Johannes Kellerer, Freising (DE)

(73) Assignee: EADS Deutschland GmbH, Ottobrunn (DE)

( * ) Notice: Subject to any disclaimer, the term of this patent is extended or adjusted under 35 U.S.C. 154(b) by 332 days.

(21) Appl. No.: 13/314,873

(22) Filed: Dec. 8, 2011

(65) Prior Publication Data
US 2012/0147133 A1 Jun. 14, 2012

(30) Foreign Application Priority Data
Dec. 9, 2010 (DE) .......................... 10 2010 053 895

(51) Int. Cl.
*H04N 7/00* (2011.01)
*H04N 5/247* (2006.01)
*G06T 3/00* (2006.01)
*H04N 5/232* (2006.01)

(52) U.S. Cl.
CPC ........... *H04N 5/23238* (2013.01); *H04N 5/247* (2013.01); *G06T 3/0012* (2013.01)
USPC .............. 348/36; 348/117; 348/118; 348/123

(58) Field of Classification Search
CPC .. H04N 5/23238; H04N 5/232; G08G 5/0021
USPC ..................................... 348/36, 117, 123, 118
See application file for complete search history.

(56) References Cited

U.S. PATENT DOCUMENTS

| | | | |
|---|---|---|---|
| 4,689,748 A * | 8/1987 | Hofmann | 701/514 |
| 5,495,576 A | 2/1996 | Ritchey | |
| 6,337,708 B1 * | 1/2002 | Furlan et al. | 348/36 |
| 8,106,936 B2 * | 1/2012 | Strzempko et al. | 348/36 |
| 2007/0097206 A1 | 5/2007 | Houvener et al. | |
| 2009/0309811 A1 | 12/2009 | Hinton | |
| 2010/0141482 A1 * | 6/2010 | Wyatt et al. | 340/975 |

* cited by examiner

*Primary Examiner* — Thai Tran
*Assistant Examiner* — Jose Mesa
(74) *Attorney, Agent, or Firm* — Crowell & Moring LLP

(57) ABSTRACT

An apparatus for rendering surroundings includes an image source, image signal processing device, and image reproduction device. The image source feeds input image signals to the image signal processing device to create output image signals for a panoramic image that are forwarded to the image reproduction device for displaying the panoramic image. The image signal processing device processes the input image signals such that a first region of the panoramic image is reproduced undistorted or compressed in a first compression and a second region of the panoramic image is reproduced compressed in a second compression. The image signal processing device is configured such that the portion of the regions reproduced undistorted or compressed is variably selectable, the compression of the regions reproduced compressed is selectable, and these changes in the region reproduced compressed may occur during the operation of the apparatus for rendering surroundings.

16 Claims, 6 Drawing Sheets

APPARATUS FOR RENDERING SURROUNDINGS AND VEHICLE HAVING SUCH AN APPARATUS FOR RENDERING SURROUNDINGS AND METHOD FOR DEPICTING PANORAMIC IMAGE

CROSS-REFERENCE TO RELATED APPLICATIONS

The present invention claims priority under 35 U.S.C. §119 to German Patent Application No. 10 2010 053 895.7, filed Dec. 9, 2010, the entire disclosure of which is herein expressly incorporated by reference.

TECHNICAL FIELD

The present invention relates to an apparatus for rendering surroundings and to a vehicle having such an apparatus for rendering surroundings and to a method for depicting a panoramic image.

BACKGROUND AND SUMMARY OF THE INVENTION

Aircraft guidance systems are intended to display tactical and navigational information from a synthetic exterior view overlaid on an image reproduction device in the aircraft cockpit. Conventionally, perspective displays on cockpit display units have been confined to a limited segment of the airspace in the direction of the flight. This narrow angular range in front of the aircraft is not adequate for the tasks of the aircraft pilot, however, who must monitor all of the airspace. Until now only an area of observation disposed in a relatively narrow image angle in front of the aircraft has been displayed to the pilot on the image reproduction device in the cockpit.

This problem involving depicting an area of observation having a large image angle on an image reproduction device disposed in a cockpit relates not only to aircraft but also to other types of vehicles, for instance land vehicles or watercraft or even stationary devices.

U.S. Patent Application Publication 2009/0309811 A1 discloses an image display system in which an image to be displayed is compressed in the peripheral regions of the image before being displayed on a user's head-mounted display apparatus so that these peripheral regions that are in the user's peripheral vision are more compressed than the central image display area. This image that is compressed on the periphery is then re-expanded for depiction on the image reproduction device so that the image actually displayed is reproduced undistorted over the entire image angle, but has significantly lower resolution on the periphery. Accordingly, the number of pixels required for the image display is to be reduced so that the resolution of the displayed image is adapted to the user's vision. Thus, high image resolution is created in the central image area, while the image resolution in the peripheral visual range is low. The user thus obtains a high resolution image in the region of his central view, while the resolution of the image displayed for him decreases towards the peripheral regions of the image. It is also mentioned, however, that the re-expansion step may be omitted.

U.S. Pat. No. 5,495,576 A discloses generating a virtual image from a plurality of sensor data (e.g., radar, camera) that are detected simultaneously from all sides of a three-dimensional object, the virtual image being displayed to a user on a display apparatus.

U.S. Patent Application Publication No. 2007/0097206 A1 discloses a panoramic camera system that comprises a plurality of camera units attached to a vehicle, each of which is oriented in a different viewing direction around the vehicle. A panoramic image is obtained from image data recorded by these cameras and is reproduced on a display apparatus, enabling a 360° view around the vehicle.

Exemplary embodiments of the present invention are directed to an apparatus for rendering surroundings by means of which it is possible for an operator to see an area of observation at a wide image angle on an image reproduction device without distortions in the displayed image that could impair the operator's ability to apprehend the situation. Exemplary embodiments of the present invention also provide a vehicle having such an apparatus for rendering surroundings and to provide a method for depicting a panoramic image.

To this end the apparatus for rendering surroundings is provided with at least one image source, an image signal processing device, and at least one image reproduction device, the input image signals supplied by the image source being fed to the image signal processing device, the image signal processing device processing the input image signals fed to it to create output image signals for a panoramic image, the output image signals from the image signal processing device being forwarded to the image reproduction device for displaying the panoramic image, and the image signal processing device processing the input image signals such that at least a first region of the panoramic image is reproduced undistorted or compressed in a first compression and at least a second region of the panoramic image is reproduced compressed in a second compression. The image signal processing device is embodied such that the portion of the regions reproduced undistorted or compressed is variably selectable on the entire panoramic image, such that the compression of the regions reproduced compressed can be selected as desired, and such that these changes in the regions reproduced compressed may occur during the operation of the apparatus for rendering surroundings.

The image signal processing device in the inventive apparatus for rendering surroundings permits the image information produced by an image source or by a plurality of image sources, which information is fed to the image signal processing device as input image signals, to be processed such that the horizontal and/or vertical compression of the image angle that is covered by the image source or image sources at an image angle that corresponds to the view angle of the operator onto the image reproduction device is not compressed with the same compression over the entire surface of the panoramic image displayed on the image reproduction device, but rather is reproduced with different horizontal and/or vertical compressions.

One advantageous special case occurs when compression occurs only in one part of the panoramic image, while another part of the panoramic image, which as a rule corresponds to the main viewing direction of the operator, in which the operator must be able to see and recognize objects accurately, is reproduced in an undistorted manner.

In this manner it is possible for the operator, for instance the vehicle driver or the aircraft pilot, to have the region of his field of vision that is required for steering the vehicle or aircraft displayed correctly for him by the image reproduction device such that on the other hand, however, he can see peripheral to and where necessary above and below this main view direction on the image reproduction device a region that is compressed, that is, distorted, but in which the operator can perceive things that are outside of his natural field of vision.

While in the prior art the undistorted reproduction is always limited to the central view angle of the operator and the compressed image portions are provided in the peripheral region, in the inventive apparatus for rendering surroundings the portion of the second region reproduced compressed is variable and moreover the compression of the second region may be selected as desired. These changes in the second region reproduced compressed may be made as desired during the operation of the device for rendering surroundings.

This variability, which is not known from the prior art, makes it possible either for the operator himself to select the portion of the compressed region and the compression or, for example, when there is a threat coming from a specific direction (for instance, a missile that is approaching an aircraft and that is detected by a sensor on the aircraft), for the threat region to be automatically reproduced undistorted on the image reproduction device, even if this threat region is in a second region of the panoramic image that was previously reproduced compressed.

The image signal processing device is preferably embodied such that at least one additional region of the panoramic image may be reproduced with another compression that is different from the first and second compressions. This embodiment makes it possible for the panoramic image to be compressed by region as desired with different compressions. For instance, regions of the panoramic image that are less important for a current operating situation may be reproduced highly compressed and regions that are less important for the current operating situation may be reproduced less highly compressed or even undistorted. These regions may be selected either manually by the operator or automatically by a corresponding navigation or vehicle guidance support device. The selection of the regions to be compressed and the selection of the compression to be assigned to each respective region occurs during the running time so that in each operating situation it is possible to adjust an individual depiction of the panoramic image manually or automatically.

In another advantageous embodiment, the sight angle corresponding to a region reproduced undistorted or compressed may be selected as desired in a horizontal plane between 0° and 360° and also the sight angle corresponding to a region reproduced undistorted or compressed may be selected as desired in a vertical plane between the nadir sight angle of −90° and the zenith sight angle of +90°. In this manner any desired selection of the sight angular range to be compressed and to be displayed on the panoramic image screen may be made from the entire visual range surrounding the operator or the specific sensor position.

Preferably a plurality of image sources is provided, the viewing directions of the image sources being oriented in different directions about an operator, preferably proceeding from the operator observing the surroundings. In this manner it is possible for the apparatus for rendering surroundings to cover a very wide observation angle.

In one preferred embodiment, at least one of the image sources has a data processing device that is programmed to transmit to the image signal processing device image data of a stored digital terrain model as image signals. This feeding of image data of a stored digital terrain model as a realistic image of a virtual view in a specific viewing direction can occur by means of a computer without additional image source hardware. The use of data from a stored digital terrain model as image signals has a number of advantages over obtaining image signals by means of sensors in real time. The data stored in a digital terrain model can be significantly more precise because they may be obtained for instance with measuring methods that are more complex than is possible in real time using onboard means. Moreover, the use of image data from a stored digital terrain model does not depend on the weather. Also, the data from the terrain model are not subjected to any shadowing, as may be the case when obtaining data in real time by means of sensors, for instance due to terrain structures in the area to be covered by an image sensor. While sensors for obtaining image data in real time are subject to a range limitation, there are no range limitations when using image data from a stored digital terrain module if the user is moving in the stored terrain model. Another important advantage of the use of image data from a stored digital terrain model compared to obtaining image data by means of active sensors, that is, sensors that radiate a signal, is the fact that access to the image data from the stored digital terrain model is "silent," which is important especially during military operations to prevent the user from being detected by a signal being radiated by an active sensor.

At least one of the image sources is preferably formed by at least one sensor that is configured to detect approaching objects and to transmit to the image signal processing device as image signals position data for this object, the position data resulting from the detection. With this variant, sensors that detect, for instance, approaching flying objects in non-visible light (radar or infrared sensors), may be integrated into a total system comprising a plurality of image sources. It is especially possible to obtain on the image reproduction device a reliable rendering of an object approaching the operator while attaining the aforesaid advantages of the digital terrain model when these sensor signals are overlaid on a digital terrain model.

In another preferred embodiment, at least one of the image sources is formed by an image acquisition device, for instance a video camera. This variant is especially suitable when the region located in the viewing direction of the observer, for instance a segment disposed in front of a vehicle, is to be integrated into the panoramic image as a live image for display on the image reproduction device.

The viewing directions for the image sources are preferably oriented such that the image sources include, at least in a first plane image, information for a field of vision with an image angle of greater than 120°, preferably greater than 180°, more preferably 360°. The horizontal expansion of the field of vision for both eyes of a person extends approximately 180°, perception of moving objects being reduced, however, at the outer periphery and specific object recognition no longer being possible at the peripheral area of the field of vision. The inventive apparatus for rendering surroundings clearly supplies more information particularly when the horizontal field of vision that is covered by the image sources or by the image source is between 120° and 180° since not only can the operator just perceive objects disposed in the peripheral regions of his field of vision due to their movement, but he can also recognize and possibly identify them.

It is particularly advantageous when the region of the panoramic image that corresponds to the viewing direction of the operator is reproduced undistorted. This makes it possible for the operator to always be able to see clearly and undistorted the region that is important to his need for information.

The image signal processing device preferably obtains information about the current viewing direction of the operator so that the region of the panoramic image that is reproduced undistorted corresponds to the current viewing direction of the operator, even if the operator moves and thus changes his viewing direction. Such automatic adjustment of the region reproduced undistorted to the current viewing direction of the operator makes it possible to allow the region of the panoramic image reproduced undistorted and displayed on the image reproduction device to shift when the operator changes his viewing direction. Accordingly, it is not necessary for the entire viewing angle that corresponds to the natural field of vision of the operator to be reproduced undistorted, but rather only a central, narrow viewing angle from the image reproduction device needs to be reproduced undistorted.

However, it is also advantageous when the operator can influence the image signal processing device such that it can select regions of the panoramic image displayed for him on the image reproduction device that are to be reproduced undistorted. In this manner it is possible for the operator to view undistorted an object discovered in the peripheral region of the panoramic image, which is reproduced distorted, by shifting the region of the panoramic image that is reproduced undistorted or by creating an additional region that is reproduced undistorted.

The apparatus for rendering surroundings is preferably part of a vehicle, especially an aircraft, and the image source is or the image sources are arranged on the vehicle and preferably provide a rendering that proceeds from the vehicle and that is at least semi-circular or circular. This embodiment of the inventive apparatus for rendering surroundings is especially advantageous for many areas of application in which what happens in the peripheral sections of a pilot's natural field of vision can be significant, with relatively low complexity, because it provides a noticeable gain in information.

The undistorted region of the panoramic image preferably reproduces an image sector located in the direction of travel. This makes it possible for the vehicle driver to also drive the vehicle exclusively using the panoramic image displayed on the image reproduction device, which represents a great advantage for instance for armored vehicles or even for remotely controlled vehicles for which the pilot and the image reproduction device are disposed outside of the vehicle.

In another preferred embodiment, the compression of the image reproduction increases from the region of the panoramic image that is reproduced undistorted to its sides. Because of this, the region of the panoramic image that is less relevant for the current main viewing direction takes up less space on the image reproduction device so that the remaining space can be better used for the regions of the panoramic image that are reproduced less distorted or undistorted.

One particularly advantageous use of the apparatus for rendering surroundings in accordance with the present invention is in a vehicle, especially in an aircraft, that is equipped with an inventive apparatus for rendering surroundings that may also have the aforesaid advantageous refinements.

The apparatus for rendering surroundings is used in a particularly advantageous manner when the vehicle is an unmanned vehicle, such as an unmanned aircraft. In this case the image reproduction device is provided in a remote control unit provided outside of the vehicle. The image signal processing device may be provided in the vehicle or in the remote control unit. The corresponding image signals are transmitted, preferably wirelessly, between the vehicle and the remote control unit.

The part of the object that relates to the method is attained using the method for depicting a panoramic image for an operator on an image reproduction device of an inventive apparatus for rendering surroundings. This method has the following steps:

Providing input image signals that are supplied by at least one image source;

Processing the input image signals to create output image signals for the panoramic image such that at least a first region of the panoramic image is undistorted or is compressed in a first compression and at least a second region of the panoramic image is compressed in a second compression.

Forwarding the output image signals to the image reproduction device, and,

Displaying the panoramic image on the image reproduction device, each compression of the regions reproduced compressed being individually variably selectable as desired.

The processing of the input image signals in accordance with the inventive method attains output image signals produced from the input image signals obtained from the image source or sources, and these output image signals display on the image reproduction device a panoramic image that is reproduced with different distortion in different regions, it being possible to adjust the distortions, especially compressions, in one or two dimensions during the display, that is as desired during running time.

In one advantageous refinement of this method, an operator may select where an undistorted or distorted reproduction should occur on the panoramic image. This can occur, for instance, by the operator touching the region that is to be undistorted or distorted on the image reproduction device embodied as a touch-sensitive image screen or the operator can use operating means, known per se, on the image reproduction device to place a cursor on the desired location at which the undistorted or distorted image reproduction is to occur.

Alternatively or in addition thereto, it may also be provided that a region to be reproduced undistorted or less distorted on the panoramic image displayed on the image reproduction device is determined automatically based on an automatically detected object or event. Thus, for instance, when a sensor detects an object approaching from a specific direction, the region in which this object is located may be automatically reproduced undistorted or less distorted on the image reproduction device.

Preferred exemplary embodiments of the invention with additional details and further advantages are described and explained in detail in the following and reference the attached drawings.

DETAILED DESCRIPTION

Figure 1:
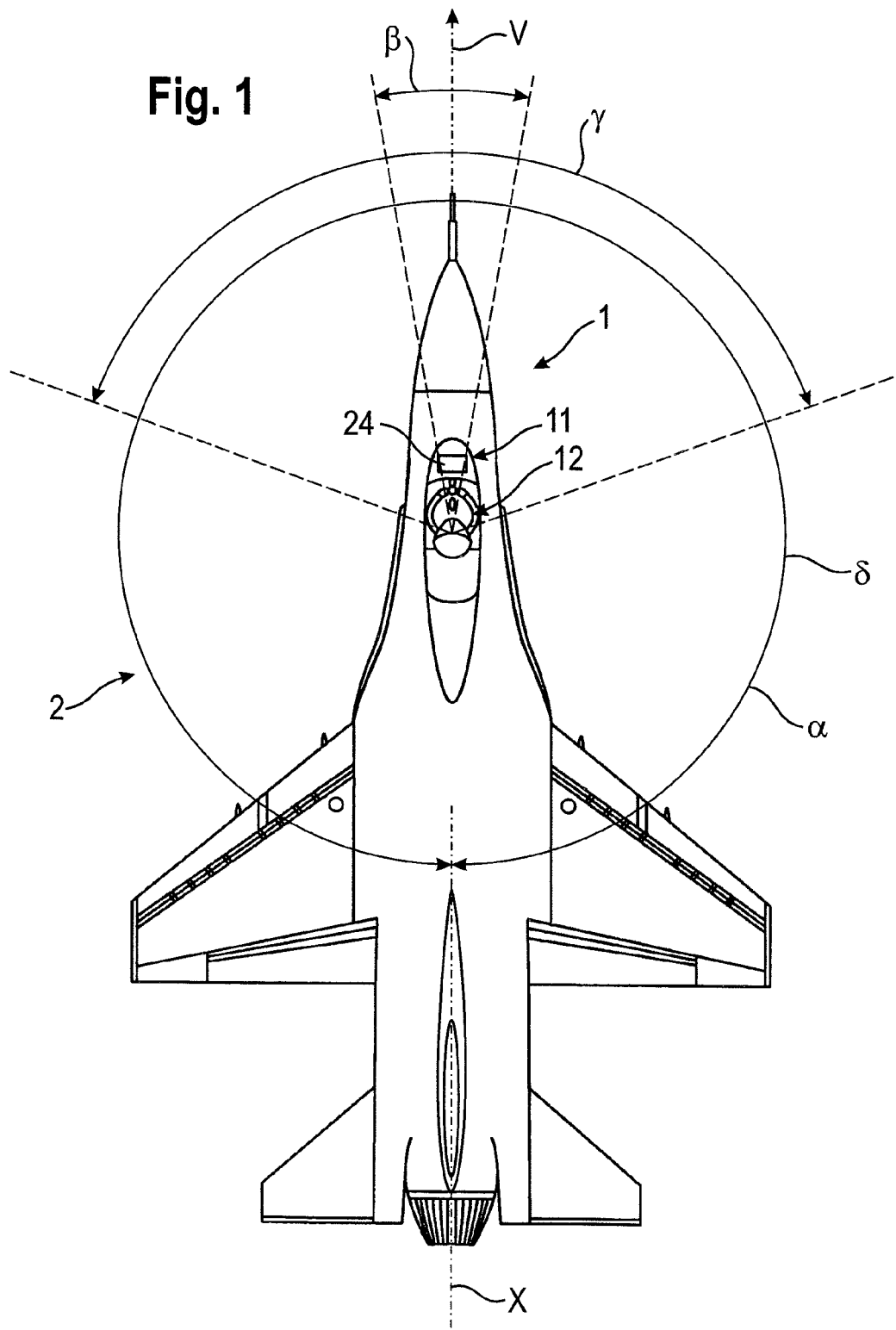
FIG. 1 depicts an aircraft having an inventive apparatus for rendering surroundings.

FIG. 1 depicts an aircraft 1 equipped with the inventive apparatus for rendering surroundings 2. The aircraft 1 has a plurality of image sources. Also illustrated in FIG. 1 are the cockpit 11 of the aircraft 1 and the pilot 12, who is the operator of the apparatus for rendering surroundings 2, an image reproduction device 24 for the apparatus for rendering surroundings 2 being depicted schematically in the cockpit 11.

Figure 2:
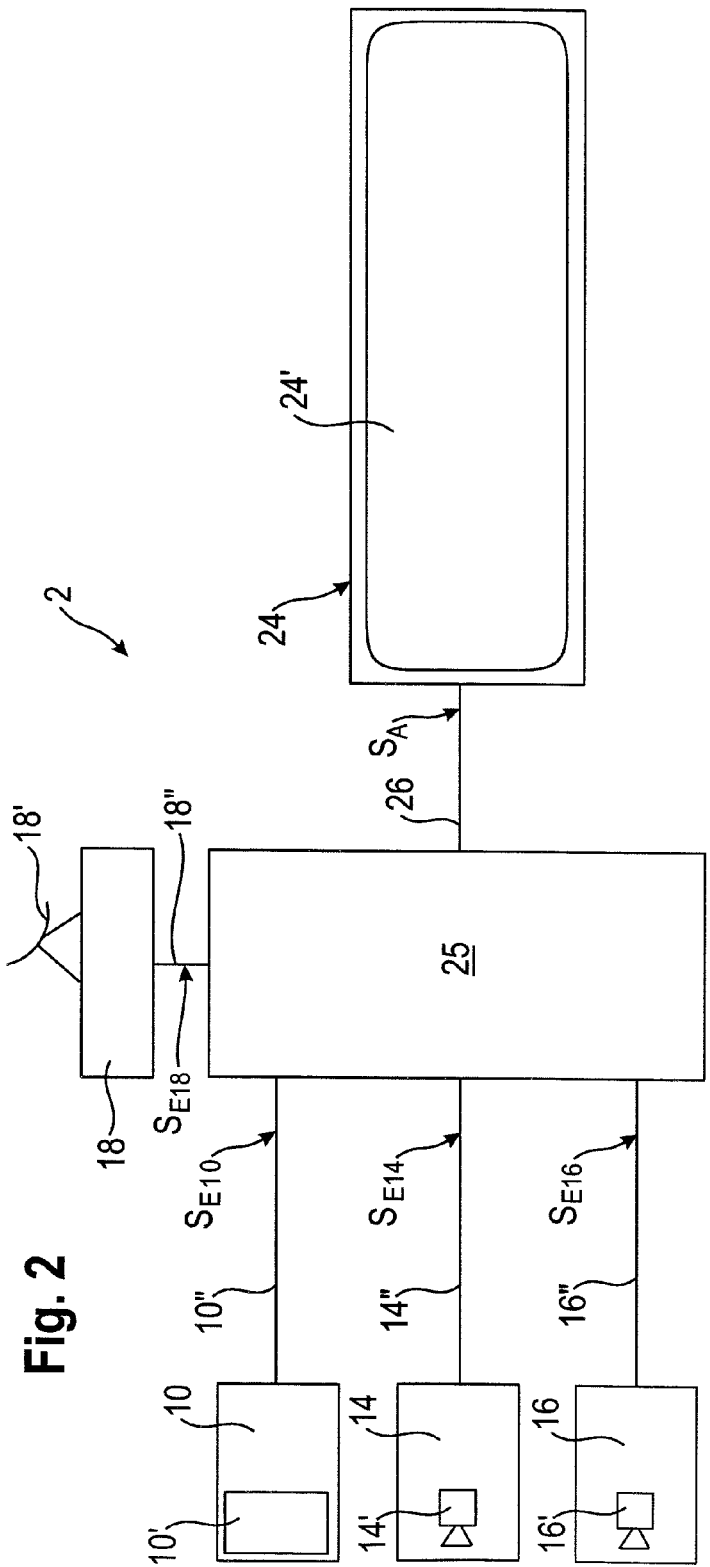
FIG. 2 is a schematic depiction of the components of an inventive apparatus for rendering surroundings in accordance with FIG. 1.

A digital terrain model of the surroundings in which the aircraft is currently located is provided as the first image source, the digital terrain model being is stored in a data memory unit 10' of a computer 10 (FIG. 2). The virtual image supplied by this synthetic image source extends across a horizontal image angle of $\alpha=360°$ around the aircraft. This synthetic exterior view is produced from one or a plurality of digital terrain module(s) that are stored in the memory unit 10' stored in the computer 10 and that form a database for the image data. To this end, a virtual camera for an image production program running in the computer "films" a digital terrain model to generate a computer-supported dynamic image, the image data of which are transmitted as input image signals SE10 via a data line 10" to the image signal processing device 25, as can be seen in FIG. 2.

In a manner described in greater detail below, the image signal processing device 25 forms an output image signal $S_A$ that is forwarded via a data line 26 to the image reproduction device 24 and displayed there as a panoramic image 24'. In this manner the surroundings are rendered, while the aircraft moves through the surroundings, as a synthetic perspective exterior view on the image reproduction device. The contents of this synthetic exterior view may be supplemented by additional information sources or the synthetic exterior view may be partially or completely overlaid with additional image contents.

The aircraft is provided with at least one image acquisition device 14 as an additional image source, and it has as an image-producing sensor an image acquisition sensor 14' that is formed, for instance, by an optical camera or an infrared camera. In the example shown, this image-producing sensor acquires a very narrow image sector located in the direction of flight, of +/=10° with respect to the longitudinal axis of the airplane X, i.e., a horizontal image angle of $\beta=20°$. The image signals $S_{E14}$ supplied by this image-producing sensor are fed via a data line 14" to the image signal processing device 25 and are integrated by it into the panoramic image as a real image of the surroundings.

Moreover, an object recognition device 16 having one or a plurality of tracking sensors 16' that can recognize objects and determine information about these objects is provided as an image source. Such tracking sensors are, for instance, infrared tracking sensors, radar tracking sensors, IFF (identification friend or foe) sensors, or so-called ELS (emitter locator system) sensors that can locate a radar station that transmits a radar search beam. These tracking sensors can recognize objects in an angular range of +/−70° in the direction of travel, that is, in a horizontal image angle of $\gamma=140°$, and determine different information about these objects, for instance their position, speed, or direction of movement. This information is transmitted to the image signal processing device 25 as input image signal $S_{E16}$ via a data line 16" and integrated by the latter into the panoramic image displayed on the image reproduction device. This enhances the image with additional information. In this case the operator does not have to recognize the object himself, but rather the presence of an object and its properties are displayed to the operator on the image reproduction device 25 using a corresponding symbol.

Finally, monitoring information received via radio data transmission by means of a receiver 18 forming the image source and an antenna 18' may also be transmitted to the image signal processing device 25 as input image signals $S_{E18}$ via a data line 18". This monitoring information is transmitted, for instance, from a radar station on the ground or from other airborne reconnaissance aircraft (e.g. AWACS) and represents a track reporting signal that results from monitoring the entire surroundings of the aircraft 1 at a horizontal image angle of $\delta=360°$. This monitoring information deriving from other information sources is thus fed to the image signal processing device 25 and integrated by the latter in a suitable manner, for instance as displayed symbols, into the panoramic image displayed on the image reproduction device, the panoramic image being an exterior view that is partly synthetic and partly real.

Consequently additional image information from various other image sources or information sources, such as for instance optical cameras or infrared cameras or even image signals generated by means of other methods such as an imaging radar may be integrated into the synthetic exterior view generated by the digital terrain model. The real surroundings detected by the imaging sensors of the image sources are reproduced on the image reproduction device. This replication of the real surroundings can be displayed instead of or in addition to the synthetic exterior view of the digital terrain model in the angular region corresponding to the viewing direction of the sensor in question.

Figure 3:
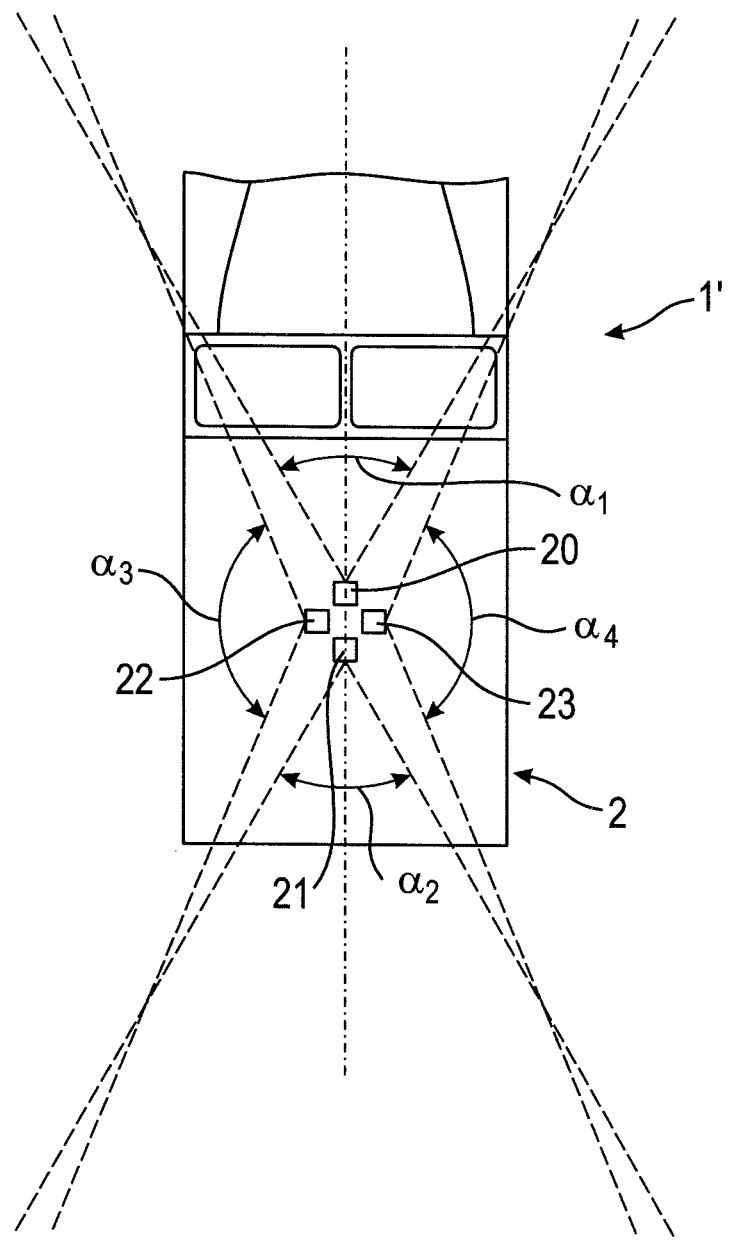
FIG. 3 depicts an armored vehicle having an inventive apparatus for rendering surroundings.

FIG. 3 depicts an alternative use of the inventive apparatus 2 for rendering surroundings in an armored vehicle 1'. This vehicle 1' has four image acquisition devices 20, 21, 22, 23 for image sources, for instance cameras that work in the visible light spectrum. However, it is also possible to provide as an alternative or in addition image acquisition devices that work in wavelength ranges that are outside of the visible light spectrum, for instance in the infrared range.

A first image acquisition device 20 is facing the forward driving direction and has an image acquisition range with a horizontal view angle $\alpha_1$ of 60°. A backward-facing image acquisition device 21 with a horizontal view angle $\alpha_2$ of 90° is attached to the vehicle. In addition, image acquisition devices 22, 23, each of which cover a horizontal view angle $\alpha_3, \alpha_4$ of 120° are provided on the left and right sides of the vehicle 1'. In this manner it is possible to have a 360° view around the vehicle 1' with the four image acquisition devices 20, 21, 22, 23.

Figure 4:
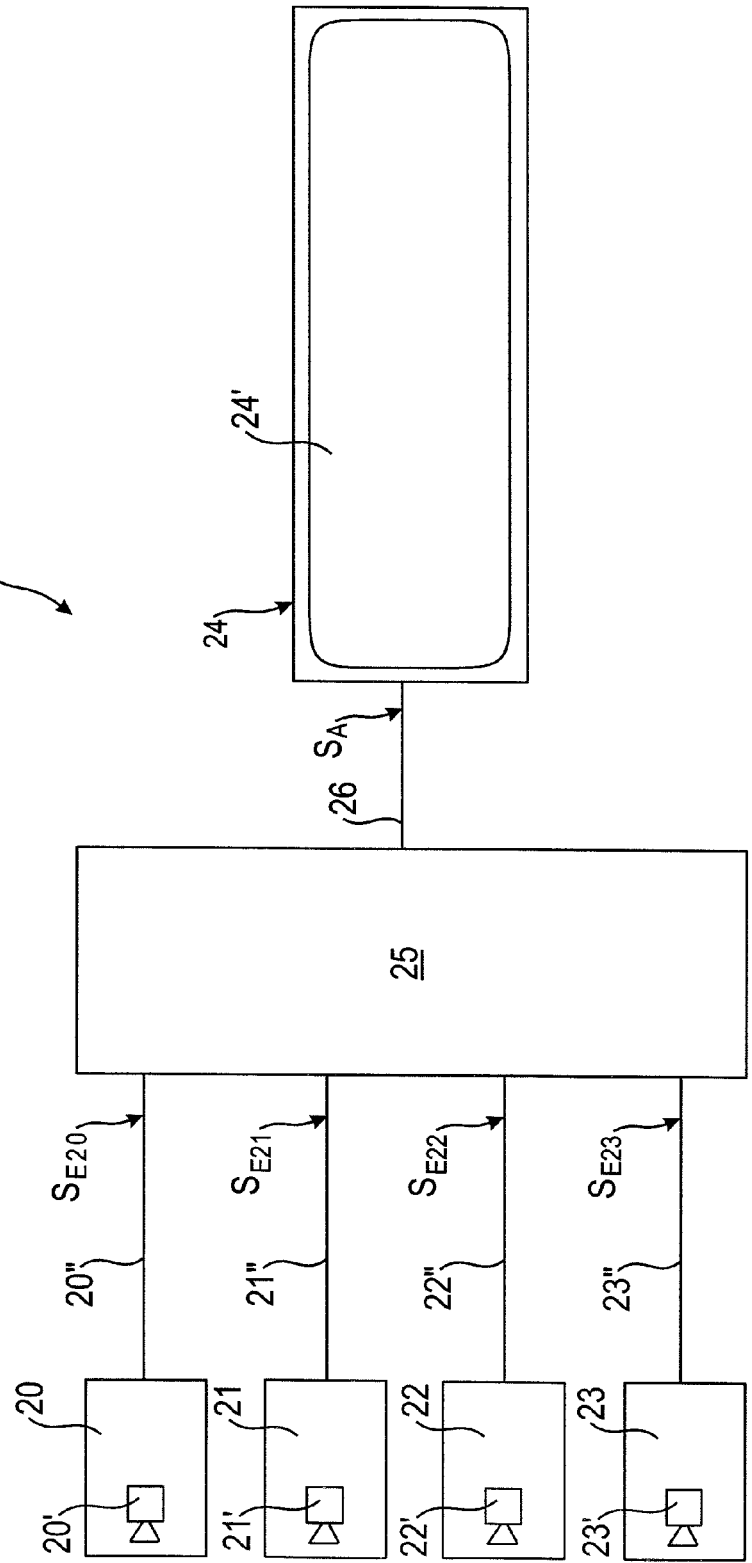
FIG. 4 is a schematic depiction of components of an inventive apparatus for rendering surroundings in accordance with FIG. 3.

FIG. 4 is a schematic depiction of the structure of the apparatus 2 for rendering surroundings for this application. The image acquisition devices 20, 21, 22, 23, are each provided with an image acquisition sensor 20', 21', 22', 23' that generates electronic image data from an optically obtained image. These image data that are generated in each of the image acquisition devices 20, 21, 22, 23 are forwarded as image signals $S_{E20}$, $S_{E21}$, $S_{E22}$, $S_{E23}$ from the respective image acquisition devices 20, 21, 22, 23 via corresponding data lines 20", 21", 22", 23" to the image signal processing device 25.

In the following the functioning of the inventive apparatus for rendering surroundings will be explained using the two examples described below.

The incoming image signals $S_{E10}$, $S_{E14}$, $S_{E16}$, $S_{E18}$ and $S_{E20}, S_{E21}, S_{E22}, S_{E23}$ are merged in the image signal processing device 25 and from the image information contained in them consolidated image information is created in which the image information supplied by the individual image sources 10, 14, 16, 18 and 20, 21, 22, 23 are combined to create a consolidated image as a panoramic image. This consolidated image information is then subjected to image processing, described below, and forwarded as output image signal $S_A$ via another image data line 26 from the image processing device 25 to the image reproduction device 24, which can be formed for instance by a panoramic image screen.

Figure 5A:
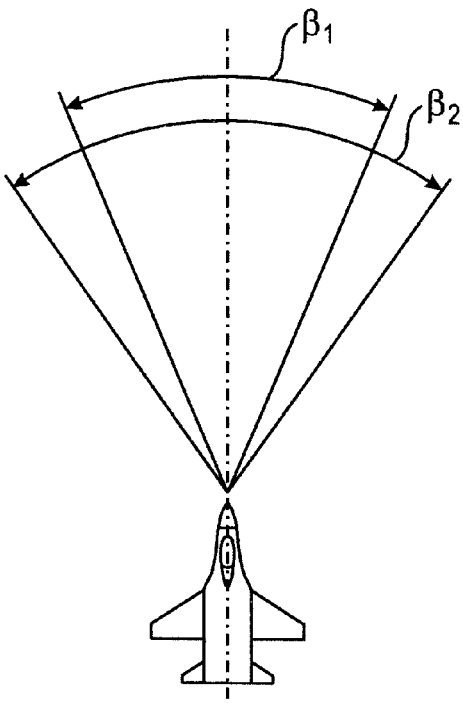
FIG. 5 depicts an example of a classic expanded field of vision.
Figure 5B:
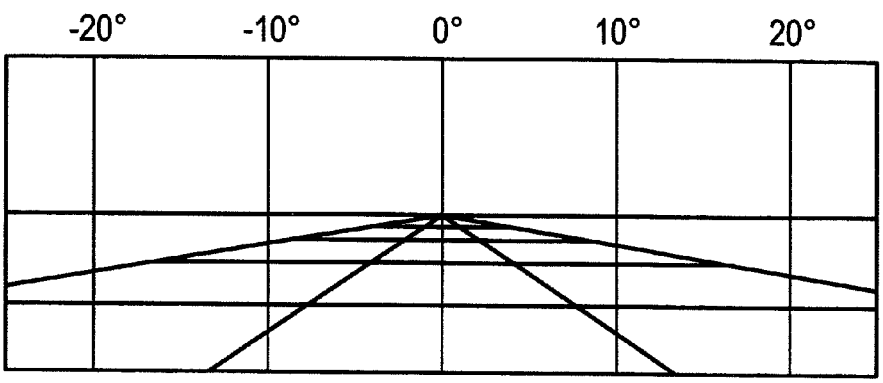
Figure 5C:
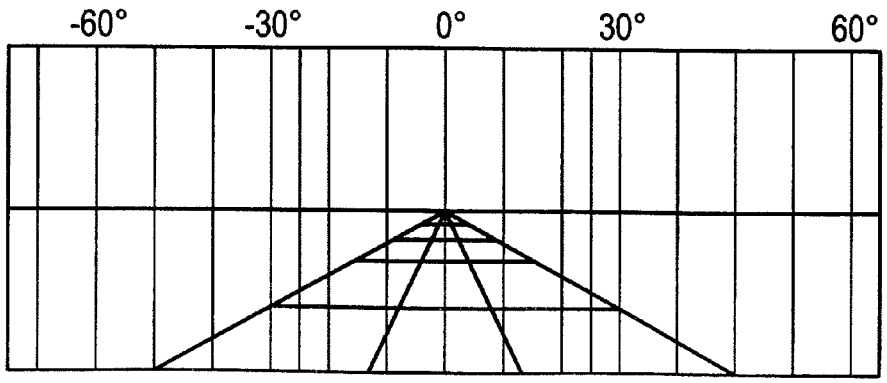

Due to the expansion of the field of vision for the operator 12 (e.g. the aircraft pilot or the vehicle driver), which expansion occurs in this manner, initially the field of vision displayed on the image reproduction device is compressed as is shown using another example in FIGS. 5A through 5C.

FIG. 5B is a schematic depiction of the field of view with a horizontal viewing angle of about 50° that the operator, for instance the aircraft pilot, has in his view in the direction of flight. If this field of vision is rendered on the image reproduction device 24, the result is the undistorted rendering in accordance with FIG. 5B. This field of vision corresponds to the image angle $\beta_1$ in FIG. 5A.

If the field of vision is now enlarged using the inventive apparatus for rendering surroundings, this enlargement being depicted symbolically by the horizontal image angle $\beta_2$ in FIG. 5A, and if this larger field of vision is rendered on the same image reproduction device, as shown in FIG. 5C, the result is horizontal compression of the entire image.

Figure 6A:
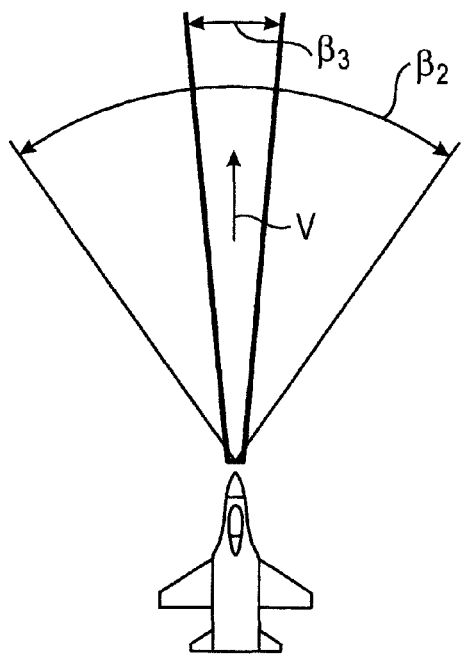
FIG. 6 depicts an example of an expanded field of view with an inventively provided undistorted region.
Figure 6B:
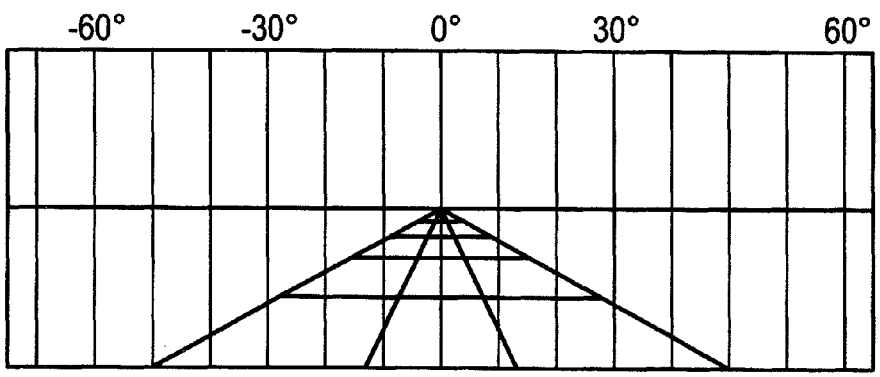
Figure 6C:
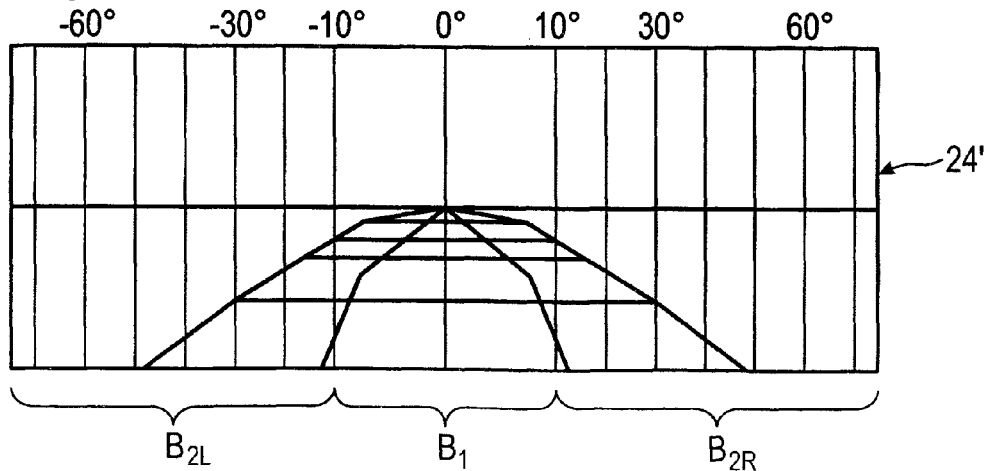

This horizontal compression is then re-expanded in the image processing device 25 in a central region corresponding to the view of the aircraft pilot 12 in the direction of flight so that an undistorted rendering results on the image reproduction device 24 (FIG. 6C) in the central region $B_1$, which extends in the example shown in FIGS. 6A through 6C across a horizontal view angle $\beta_3$ of about 20° (FIG. 6A). The remaining second regions $B_{2L}$ and $B_{2R}$ running from the center region $B_1$ to the periphery are reproduced more compressed horizontally than is the case in the uniform compression across the entire field of vision that is shown in FIG. 6B.

In this manner the inventive apparatus for rendering surroundings both enlarges the field of vision and, due to the expansion in the central region of the field of vision, i.e., in viewing direction V of the vehicle driver or aircraft pilot, attains a realistic replication so that the vehicle driver or aircraft pilot 12 can perform his driving/flying duties with no limitations.

The vehicle driver or aircraft pilot 12 can use the additional information present in the compressed peripheral area $B_{2L}$ and $B_{2R}$ for route planning and monitoring. If monitoring the entire air space around the aircraft is required, as is the case, for instance, with a fighter aircraft, the rendering on the image reproduction device 24 can include an angular range of +180° to −180°, as is shown in the example in FIG. 1. In this case, individual regions of the panoramic image 24' rendered on the image reproduction device 24 may be compressed differently. Thus, for instance, the central region $B_1$, in which the real image recorded by a camera is reproduced, may be reproduced undistorted. The lateral regions adjacent thereto to about +90° on the one side and −90° on the other side, in which the tracking information can be superimposed onto a virtual surroundings image, can be less compressed than the more compressed outermost lateral peripheral regions between −90° and −180° or +90° and +180°, in which the virtual surroundings image is rendered. Such high compression in this region has almost no effect on the monitoring task.

In a central projection the expansion of the field of vision displayed on the image reproduction device 24 leads to distortions on a flat screen. Therefore, it is advantageous when a central projection onto a spherical surface is initially performed by computer in the image signal processing device and when the data from this spherical replication then, as processing of the spherical projection surface to a flat projection surface, are converted into image data for the flat projection surface and then are compressed to the size of the screen for the image reproduction device 24. This procedure may be performed both in the horizontal plane and, alternatively or additionally, in the vertical plane.

The display thus generated occurs using a concentric projection of the airspace onto a spherical projection surface. The sphere is processed onto the flat rendering surface of the screen so that the lines of the same elevation and the same azimuth provide an orthogonal grid. The change in this angle may occur during operation.

Moreover, it is possible to give a variable portion of this compressed perspective exterior view any desired selectable compression. The rest of the display is then adapted according to its compression in order to further replicate the desired section of the airspace. Thus, for example, the image section in the direction of flight can be rendered undistorted and realistically while the rest of the rendering is still compressed. The aircraft pilot has the opportunity to select any size section as desired from the airspace surrounding him and to have it displayed in perspective. Accordingly, the recording of relevant tactical and navigational information can be optimized with respect to working efficiency and working effectiveness, the working load can be reduced, and the performance of aircraft pilot and system overall can be increased.

The operator (vehicle driver or aircraft pilot) has the opportunity to have different sections of the synthetic exterior view rendered with different levels of compression. For instance, when observing different regions of the airspace, different tasks are relevant for the aircraft pilot. Using the different compression of various image regions the artificial exterior view can be adapted to the different tasks. For instance, a realistic rendering in the direction of flight serves the task of guiding the aircraft, moderate compression of the rendering to the horizontal +/−90° serves route planning, and great compression of the airspace to the rear does not have a negative effect on the monitoring mission.

Reference numbers in the claims, specification, and drawings are merely to promote better understanding of the invention and shall not limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Aircraft
1' Armored vehicle
2 Apparatus for rendering surroundings
10 Computer
10' Memory unit
10" Data line
11 Cockpit
12 Aircraft pilot
14 Image acquisition device
14' Image acquisition sensor
14" Data line
16 Object recognition device
16' Tracking sensor
16" Data line
18 Receiver
18' Antenna
18" Data line
20 Image acquisition device
20' Image acquisition sensor
20" Data line
21 Image acquisition device
21' Image acquisition sensor 21" Data line
22 Image acquisition device
22' Image acquisition sensor
22" Data line
23 Image acquisition device
23' Image acquisition sensor
23" Data line
24 Image reproduction device
25 Image signal processing device
26 Image data line
$\alpha$ Image angle
$\alpha_1$ Image angle
$\alpha_2$ Image angle
$\alpha_3$ Image angle
$\alpha_4$ Image angle
$\beta$ Image angle
$\beta_1$ View angle
$\beta_2$ View angle
$\beta_3$ View angle
$\gamma$ Image angle
$\delta$ Image angle
$B_1$ Central region
$B_{2L}$ Compressed region
$B_{2R}$ Compressed region
$S_A$ Output image signal
$S_{E10}$ Input image signal
$S_{E14}$ Input image signal
$S_{E16}$ Input image signal
$S_{E18}$ Input image signal
$S_{E20}$ Input image signal
$S_{E21}$ Input image signal
$S_{E22}$ Input image signal
$S_{E23}$ Input image signal

What is claimed is:

1. An apparatus for rendering surroundings, comprising:
at least one image source;
an image signal processing device; and
at least one image reproduction device,
wherein input image signals supplied by the image source are fed to the image signal processing device,
wherein the image signal processing device is configured to process the input image signals fed to it to create output image signals for a panoramic image,
wherein the output image signals from the image signal processing device are forwarded to the image reproduction device for displaying the panoramic image,
wherein the image signal processing device is configured to process the input image signals such that at least a first region of the panoramic image is reproduced undistorted or compressed in a first compression and at least a second region of the panoramic image is reproduced compressed in a second compression,
wherein the image signal processing device is configured such that
the portion of the regions reproduced undistorted or compressed is variably selectable on the entire panoramic image,
the compression of the regions reproduced compressed is selectable, and
changes in the region reproduced compressed may occur during the operation of the apparatus for rendering surroundings,
wherein a sight angle corresponding to a region reproduced undistorted or compressed is selectable in a horizontal plane between 0° and 360° and in a vertical plane between −90° and +90°.

2. The apparatus for rendering surroundings in accordance with claim 1, wherein the image signal processing device is configured such that at least one additional region of the panoramic image is reproduced with another compression that is different from the first and second compressions.

3. The apparatus for rendering surroundings in accordance with claim 1, comprising:
a plurality of image sources, wherein viewing directions of the plurality of image sources are oriented in different directions about an operator.

4. The apparatus for rendering surroundings in accordance with claim 3, wherein at least one of the plurality of the image sources has a data processing device configured to transmit image data of a stored digital terrain model to the image signal processing device as image signals.

5. The apparatus for rendering surroundings in accordance with claim 3, wherein at least one of the plurality of the image sources includes at least one sensor configured to detect approaching objects and to transmit position data resulting from the detection to the image signal processing device as image signals position data for detected objects.

6. The apparatus for rendering surroundings in accordance with claim 3, wherein at least one of the image sources includes an image acquisition unit.

7. The apparatus for rendering surroundings in accordance with claim 3, wherein the viewing directions for the image sources are oriented such that the image sources include, at least in a first plane, image information for a field of vision with an image angle of greater than 120°.

8. The apparatus of claim 7, wherein the image angle is 360°.

9. The apparatus for rendering surroundings in accordance with claim 3, wherein a region of the panoramic image corresponding to a viewing direction of the operator is reproduced undistorted.

10. The apparatus for rendering surroundings in accordance with claim 9, wherein the image signal processing device obtains information about the current viewing direction of the operator and the region of the panoramic image that is reproduced undistorted corresponds to the current viewing direction of the operator when the operator moves and thus changes his viewing direction.

11. The apparatus for rendering surroundings in accordance with claim 9, wherein the region of the panoramic image displayed on the image reproduction device that is reproduced undistorted is selectable by the operator on the apparatus for rendering surroundings.

12. The apparatus for rendering surroundings in accordance with claim 1, wherein the apparatus is part of a vehicle and the at least one image source is or are arranged on the vehicle and provides a view originating from the vehicle and that is at least semi-circular, the undistorted region of the panoramic image further reproducing an image sector located in a direction of travel.

13. The apparatus for rendering surroundings in accordance with claim 1, wherein the compression of the reproduced panoramic image is reproduced undistorted to its sides.

14. An aircraft, comprising: an apparatus for rendering surroundings of the aircraft, comprising at least one image source; an image signal processing device; and at least one image reproduction device, wherein the input image signals supplied by the image source are fed to the image signal processing device, wherein the image signal processing device is configured to process the input image signals fed to it to create output image signals for a panoramic image, wherein the output image signals from the image signal processing device are forwarded to the image reproduction device for displaying the panoramic image, wherein the image signal processing device is configured to process the input image signals such that at least a first region of the panoramic image is reproduced undistorted or compressed in a first compression and at least a second region of the panoramic image is reproduced compressed in a second compression, wherein the image signal processing device is configured such that the portion of the regions reproduced undistorted or compressed is variably selectable on the entire panoramic image, the compression of the regions reproduced compressed is selectable, and changes in the region reproduced compressed may occur during the operation of the apparatus for rendering surroundings, wherein a sight angle corresponding to a region reproduced undistorted or compressed is selectable in a horizontal plane between 0° and 360° and in a vertical plane between −90° and +90°.

15. The aircraft of in accordance with claim 14, wherein the image reproduction device is arranged in a remote control unit provided removed from the vehicle and image signals are wireless transmitted between the vehicle and the remote control unit.

16. A method for depicting a panoramic image for an operator on an image reproduction device, the method comprising:
supplying input image signals to the image reproduce device by at least one image source;
processing the input image signals to create output image signals for the panoramic image in such a way that at least a first region of the panoramic image is undistorted or is compressed in a first compression and at least a second region of the panoramic image is compressed in a second compression;
forwarding the output image signals to the image reproduction device; and
displaying the panoramic image on the image reproduction device,
wherein each compression of the regions reproduced compressed is individually variably selectable,
wherein a sight angle corresponding to a region reproduced undistorted or compressed is selectable in a horizontal plane between 0° and 360° and in a vertical plane between −90° and +90°.

* * * * *